E. K. MACOMBER.
REVOLVING LIGHT FOR AUTOMOBILES.
APPLICATION FILED APR. 19, 1916.
1,224,763.
Patented May 1, 1917.
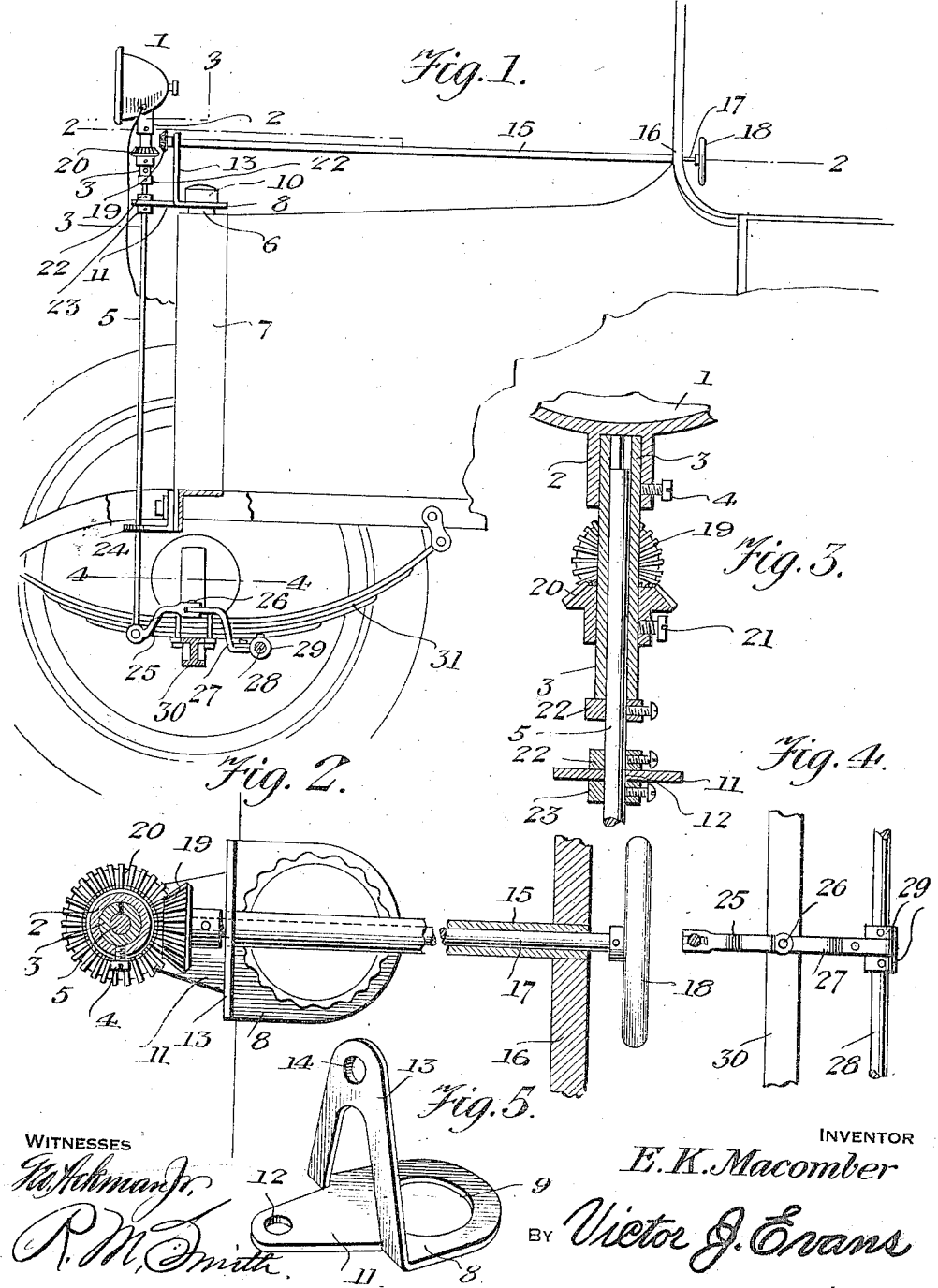
WITNESSES
INVENTOR
E. K. Macomber
BY Victor J. Evans
ATTORNEY

UNITED STATES PATENT OFFICE.

EDMUND K. MACOMBER, OF AMSTERDAM, NEW YORK.

REVOLVING LIGHT FOR AUTOMOBILES.

1,224,763.  Specification of Letters Patent.  Patented May 1, 1917.

Application filed April 19, 1916. Serial No. 92,306.

*To all whom it may concern:*

Be it known that I, EDMUND K. MACOMBER, a citizen of the United States, residing at Amsterdam, in the county of Montgomery and State of New York, have invented a new and useful Improvement in Revolving Lights for Automobiles, of which the following is a specification.

This invention relates to revolving or rotatable headlamps for automobiles and other motor vehicles, the broad object of the invention being to provide means whereby a headlamp, which is preferably disposed centrally of and above the radiator, may either be turned automatically to various angles corresponding with the angles assumed by the steering wheels of the vehicle, or turned independently thereof by hand in order to enable the operator, even when the vehicle is standing still, to so manipulate the lamp that the rays of light therefrom may be directed at an angle through an arc of three hundred and sixty degrees. This enables the driver or operator of the vehicle to illuminate any part of the road in front or in rear or at the side of the vehicle and also to read the numbers of houses in cities, signs and other matter.

With the above and other objects in view, the invention consists in the novel construction, combination and arrangement of parts, herein described, illustrated and claimed.

In the accompanying drawing:—

Figure 1 is a side elevation partly in section showing the lamp turning mechanism in its applied relation to a motor vehicle.

Fig. 2 is an enlarged horizontal section on the line 2—2 of Fig. 1.

Fig. 3 is an enlarged fragmentary vertical section on the line 3—3 of Fig. 1.

Fig. 4 is a fragmentary vertical section on the line 4—4 of Fig. 1.

Fig. 5 is a detail perspective view of the upper supporting bracket.

Referring to the drawings 1 designates a headlamp having at the bottom thereof a socket extension 2 in which is received the upper extremity of a split bushing 3 of any suitable length, the lamp 1 being fastened to the bushing 3 by means of a set screw 4.

The upper end of a lamp turning shaft 5 is fitted in the bushing 3 and the latter is adapted to be compressed by means of a regulating screw 21 threaded through a gear 20 and bearing at its inner end against said bushing.

Attached to the neck 6 of the radiator 7 of a motor vehicle as shown in Fig. 1, is a bracket illustrated in detail in Fig. 5, the same comprising a base or attaching portion 8 having an opening 9 of sufficient size to receive the neck 6 of the radiator, the bracket being held in place by means of the radiator cap 10 which, as is well known, has a threaded engagement with the radiator neck. The bracket comprises a forwardly extending arm 11 formed with a bearing hole 12 for the shaft 5. The bracket is also formed with another substantially vertical arm 13 having an opening 14 to receive one end of a tubular housing 15, the latter extending from the bracket arm 13 rearwardly to and through the instrument board, dash or wind shield 16 as shown in Fig. 2. Extending through the housing 15 and slidable and rotatable therein is an operating shaft 17 having fast on its rear end a hand wheel 18. Fast on the forward extremity of the shaft 17 is a bevel gear 19 which meshes with another bevel gear 20, the last named gear being fastened to the bushing 3 by means of the screw 21. 22 designates a stop arranged under the bushing 3 and carried by the shaft 5 and serving to support the bushing 3 in its proper position so that a gear 20 will mesh with the gear 19 when the latter is shifted into engagement therewith by longitudinally sliding the operating shaft 17. Other stops or collars 22 and 23 are carried by the shaft 5 and located above and below the horizontally extending arm 11 of the bracket so as to prevent longitudinal movement of the shaft 5 in relation to said bracket.

At a lower point, the shaft 5 passes through another or bottom bracket 24 secured to the body or frame of the vehicle as shown and at its lower extremity the shaft 5 has connected thereto a crank arm 25 the free end of which is connected by a vertical pivot 26 to another arm 27 which is carried by and attached to the usual steering knuckle arm connecting rod 28. The arm 27 is shown as confined between collars 29 on the rod 28 and the arms 25 and 27 are shown as arched over the front axle 30, thus providing for the up and down movement of the lower extremity of the shaft 5 to compensate for the action of the body supporting springs 31 which admit of the necessary up and down relative movement between the axle 30 and the body of the machine.

When the operating shaft 17 is slid rearwardly to the position shown in Fig. 1, the gear 19 is moved out of mesh with the gear 20. The shaft 5 is however connected with the connecting rod 28 and as the latter moves transversely of the path of movement of the vehicle, the lamp 1 is turned in the same direction as the steering wheels of the machine. Ordinarily the length of the arm 25 will be equal to the length of the arms on the steering knuckles, thereby causing the lamp 1 to be turned through an arc of the same number of degrees as the steering knuckles and consequently the steering wheels of the machine. When it is desired to operate the lamp 1 by hand, the operator grasps the hand wheel 18 and slides the shaft 17 forwardly until the gear 19 is in mesh with the gear 20. He then turns the shaft 17 by means of the wheel 18 and as the bushing 3 which carries the lamp 1 has a frictional engagement with the shaft 5, said bushing 3 may be turned around and upon the shaft 5 so that the rays of light from the lamp 1 may be directed to any point in an arc of three hundred and sixty degrees.

I claim:—

1. The combination with a motor vehicle, of a substantially vertical lamp turning shaft, means connecting said shaft with a member of the steering gear, whereby said shaft is turned simultaneously with the steering wheels, a lamp, a bushing by which said lamp is carried embracing and frictionally engaging said shaft, and a manually operable shaft geared to said bushing and adapted to turn said bushing and lamp independently of said lamp turning shaft.

2. The combination with a motor vehicle, of a substantially vertical lamp turning shaft, means connecting said shaft with a member of the steering gear, whereby said shaft is turned simultaneously with the steering wheels, a lamp, a bushing by which said lamp is carried embracing and frictionally engaging said shaft, and a manually operable shaft geared to said bushing and adapted to turn said bushing and lamp independently of said lamp turning shaft, said manually operable shaft being slidable toward and away from the lamp turning shaft for the purpose of connecting and disconnecting said lamp turning shaft and manually operable shaft.

3. The combination with a motor vehicle, of a substantially vertical lamp turning shaft, means connecting said shaft with a member of the steering gear, whereby said shaft is turned simultaneously with the steering wheels, a lamp, a bushing by which said lamp is carried embracing and frictionally engaging said shaft, a bracket attached to the vehicle and having a bearing for said lamp turning shaft, a gear fast on said bushing, a manually operable and substantially horizontal shaft journaled in an arm of said bracket and extending through the dash of the vehicle, operating means on the rear end of said shaft, and a gear on the forward end of said shaft adapted to mesh with the gear on the lamp turning shaft, said manually operable shaft being both rotatable and slidable, for the purpose specified.

EDMUND K. MACOMBER.